United States Patent
Lee

(10) Patent No.: US 7,315,661 B2
(45) Date of Patent: Jan. 1, 2008

(54) DIRECTIONAL INTERPOLATION METHOD USING DCT INFORMATION AND RELATED DEVICE

(75) Inventor: Yuan-Chung Lee, Tai-Nan (TW)

(73) Assignee: MediaTek Inc., Hsin-Chu, Hsien (TW)

( * ) Notice: Subject to any disclaimer, the term of this patent is extended or adjusted under 35 U.S.C. 154(b) by 719 days.

(21) Appl. No.: 10/708,923

(22) Filed: Apr. 1, 2004

(65) Prior Publication Data

US 2005/0220364 A1    Oct. 6, 2005

(51) Int. Cl.
*G06K 9/32* (2006.01)

(52) U.S. Cl. ............... 382/300; 382/266; 382/269; 382/277; 358/3.27; 358/539

(58) Field of Classification Search ........ 382/266, 382/269, 275, 300, 235, 243, 277; 358/3.26, 358/3.27, 525, 539, 426.04
See application file for complete search history.

(56) References Cited

U.S. PATENT DOCUMENTS

| | | | | |
|---|---|---|---|---|
| 5,150,432 A | * | 9/1992 | Ueno et al. | 382/250 |
| 5,282,031 A | | 1/1994 | Kim | |
| 5,488,419 A | * | 1/1996 | Hui et al. | 375/240.17 |
| 5,742,348 A | | 4/1998 | Kuwahara et al. | |
| 5,774,601 A | * | 6/1998 | Mahmoodi | 382/298 |
| 5,819,035 A | * | 10/1998 | Devaney et al. | 709/202 |
| 5,845,014 A | | 12/1998 | Jeon | |
| 6,133,957 A | | 10/2000 | Campbell | |
| 6,263,120 B1 | | 7/2001 | Matsuoka | |
| 6,330,034 B1 | * | 12/2001 | Renner et al. | 348/536 |
| 6,356,587 B1 | | 3/2002 | Choi | |
| 6,539,060 B1 | * | 3/2003 | Lee et al. | 375/240.29 |
| 6,542,693 B2 | * | 4/2003 | Boyce | 386/68 |
| 6,728,414 B1 | * | 4/2004 | Chang et al. | 382/254 |
| 6,839,092 B2 | * | 1/2005 | Renner | 348/505 |

OTHER PUBLICATIONS

T. Doyle, M. Looymans; Progressive Scan Conversion using Edge Information; Singal Processing of HDTV II; 1990; p. 711-p. 721; North-Holland.

* cited by examiner

*Primary Examiner*—Yosef Kassa
(74) *Attorney, Agent, or Firm*—Winston Hsu

(57) ABSTRACT

The invention provides a method for interpolating a pixel within an image. The image has a plurality of pixels arranged in a matrix format. The method includes detecting if there is an edge in a block of the image according to a Discrete Cosine Transform (DCT) data of the block, within which the pixel is located. The method further includes if an edge is detected, determining an interpolation direction of the pixel according to the DCT data, and interpolating the pixel according to the interpolation direction. The method further includes if no edge is detected, interpolating the pixel vertically or horizontally. A device for implementing the method is also provided.

20 Claims, 10 Drawing Sheets

| $C_{00}$ | $C_{01}$ | $C_{02}$ | $C_{03}$ | $C_{04}$ | $C_{05}$ | $C_{06}$ | $C_{07}$ |
|---|---|---|---|---|---|---|---|
| $C_{10}$ | $C_{11}$ | $C_{12}$ | $C_{13}$ | $C_{14}$ | $C_{15}$ | $C_{16}$ | $C_{17}$ |
| $C_{20}$ | $C_{21}$ | $C_{22}$ | $C_{23}$ | $C_{24}$ | $C_{25}$ | $C_{26}$ | $C_{27}$ |
| $C_{30}$ | $C_{31}$ | $C_{32}$ | $C_{33}$ | $C_{34}$ | $C_{35}$ | $C_{36}$ | $C_{37}$ |
| $C_{40}$ | $C_{41}$ | $C_{42}$ | $C_{43}$ | $C_{44}$ | $C_{45}$ | $C_{46}$ | $C_{47}$ |
| $C_{50}$ | $C_{51}$ | $C_{52}$ | $C_{53}$ | $C_{54}$ | $C_{55}$ | $C_{56}$ | $C_{57}$ |
| $C_{60}$ | $C_{61}$ | $C_{62}$ | $C_{63}$ | $C_{64}$ | $C_{65}$ | $C_{66}$ | $C_{67}$ |
| $C_{70}$ | $C_{71}$ | $C_{72}$ | $C_{73}$ | $C_{74}$ | $C_{75}$ | $C_{76}$ | $C_{77}$ |

Fig. 6

| Sign | 1 (equal) | 1 (equal) | 1 (equal) | 1 (equal) | 1 (equal) |
|---|---|---|---|---|---|
| $\|C_{01}\|-\|C_{10}\|$ | $(-\infty, -TH1)$ | $[-TH1, -TH2)$ | $[-TH2, TH2)$ | $[TH2, TH1)$ | $[TH1, \infty)$ |
| Edge index | 0 ( 0° ) | 7 ( 157.5° ) | 6 ( 135° ) | 5 ( 112.5° ) | 4 ( 90° ) |

| | 0 (unequal) | 0 (unequal) | 0 (unequal) | 0 (unequal) | 0 (unequal) |
|---|---|---|---|---|---|
| | $(-\infty, -TH1)$ | $[-TH1, -TH2)$ | $[-TH2, TH2)$ | $[TH2, TH1)$ | $[TH1, \infty)$ |
| | 0 ( 0° ) | 1 ( 22.5° ) | 2 ( 45° ) | 3 ( 67.5° ) | 4 ( 90° ) |

Fig. 7

DIRECTIONAL INTERPOLATION METHOD USING DCT INFORMATION AND RELATED DEVICE

BACKGROUND OF INVENTION

1. Field of the Invention

The present invention relates to directional interpolation of an image, and more particularly, to a method for performing directional interpolation using Discrete Cosine Transform (DCT) information and a related device.

2. Description of the Prior Art

Traditional interpolation methods assume that a two-dimensional image to be interpolated consists of a plurality of one-dimensional images, and therefore, the two-dimensional image is interpolated vertically or horizontally. Such treatment may introduce unwanted zigzag edges of objects in the image. Some directional interpolation methods have been proposed to solve the above-mentioned problem.

As shown in FIG. 1, the ELA algorithm (ref. T. Doyle and M. Looymans, Progressive scan conversion using edge information. In: L. Chiariglione, ed. Signal Processing of HDTV II, Elsevier Science Publishers B.V., North-Holland, pp. 711-721, 1990) is typical of the directional interpolation methods known in the art. Firstly, a direction corresponding to a pair of pixels having a minimum difference between their pixel values is selected from among three directions 131, 132, 133. The pixel values typically represent brightness and/or color levels of each pixel. For example, pixels 111, 123 are substantially equivalent and the difference between the values of the pixels 111, 123 is therefore smaller than the difference between the values of pixels 112, 122 and smaller than the difference between the values of pixels 113, 121. Because of this, directional interpolation should be performed along the direction 131. That is, the interpolated pixel 152 is derived from averaging the values of the pixels 111, 123. As shown in FIG. 2, pixels 201, 202, 203 are interpolated vertically while pixels 211, 212, 213 are interpolated along an edge 215 of an object 210 of an interpolated image. The shading shown for each pixel in FIG. 2 denotes a hypathetical pixel value after interpolation. It is evident in this example that the zigzag edge problem is solved by using directional interpolation. For more information about variations of the ELA algorithm, please refer to U.S. Pat. No. 5,742,348 and U.S. Pat. No. 6,133,957.

However, the above-mentioned directional interpolation algorithm introduces a new problem of faulty treatment of images with noise. Specifically, noise will decrease the correctness of the selection of the edge direction using the pixel values. Therefore, if the interpolation direction is determined according to the incorrectly selected edge direction, the directional interpolation will not work properly.

SUMMARY OF INVENTION

It is therefore an objective of the claimed invention to provide a method for performing directional interpolation using Discrete Cosine Transform (DCT) information and a related device to solve the above-mentioned problem.

According to the claimed invention, provided is a method for interpolating a pixel within an image. The image has a plurality of pixels arranged in a matrix format. The method includes detecting if there is an edge in a block of the image according to DCT data of the block. The pixel is located within the block. The method further includes if the edge is detected, determining an interpolation direction of the pixel according to the DCT data, and interpolating the pixel according to the interpolation direction. The method further includes if no edge is detected, interpolating the pixel vertically or horizontally.

The present invention further provides a device for interpolating a pixel within an image. The image has a plurality of pixels arranged in a matrix format. The device includes a detection unit for detecting an edge in a block of the image according to DCT data of the block. The pixel is located within the block. The method further includes a processing unit electrically coupled to the detection unit for determining an interpolation direction of the pixel according to DCT data and a detection result generated by the detection unit. The method further includes an interpolation unit electrically coupled to the detection unit and the processing unit for interpolating the pixel. Wherein if the edge is detected, the interpolation unit interpolates the pixel according to the interpolation direction, and if no edge is detected, the interpolation unit interpolates the pixel vertically or horizontally.

It is an advantage of the present invention method and device that the edge direction detected by the present invention method and the present invention device is more accurate than that of the prior art, and therefore, the performance of the directional interpolation of the interpolated image is improved.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 6 is a hypothetical representation of the DCT coefficients relating to the method shown in FIG. 3.

FIG. 7 is a lookup table used in the method shown in FIG. 3.

DETAILED DESCRIPTION

Figure 1:
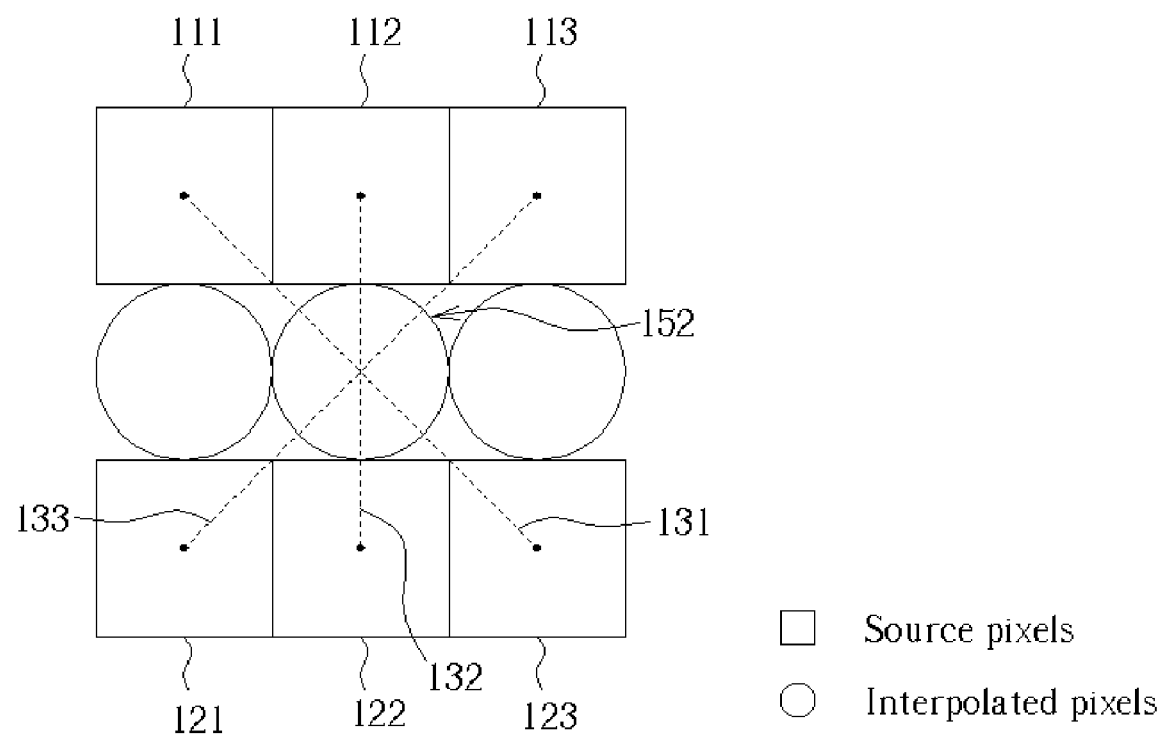
FIG. 1 is a hypothetical representation of a portion of an image interpolated by a directional interpolation method according to the prior art.
Figure 2:
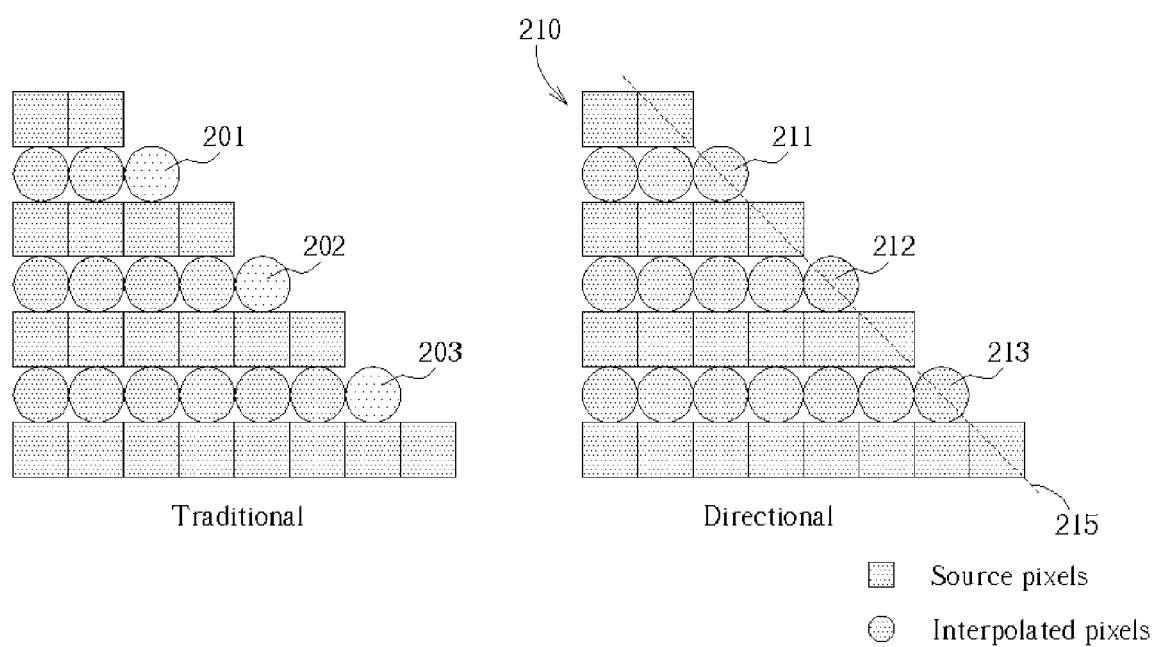
FIG. 2 is a hypothetical representation of a portion of an image interpolated by different interpolation methods according to the prior art.
Figure 3:
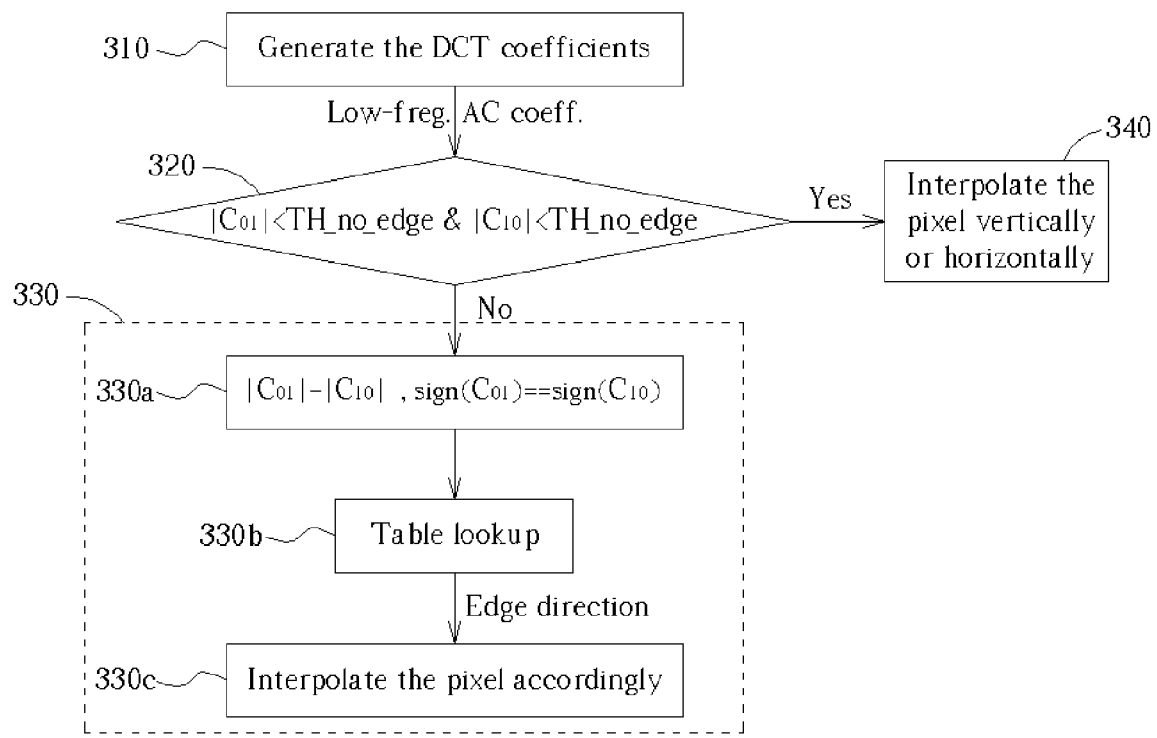
FIG. 3 is a flowchart illustrating steps of a method of pixel interpolation according to a first embodiment the present invention.
Figure 4:
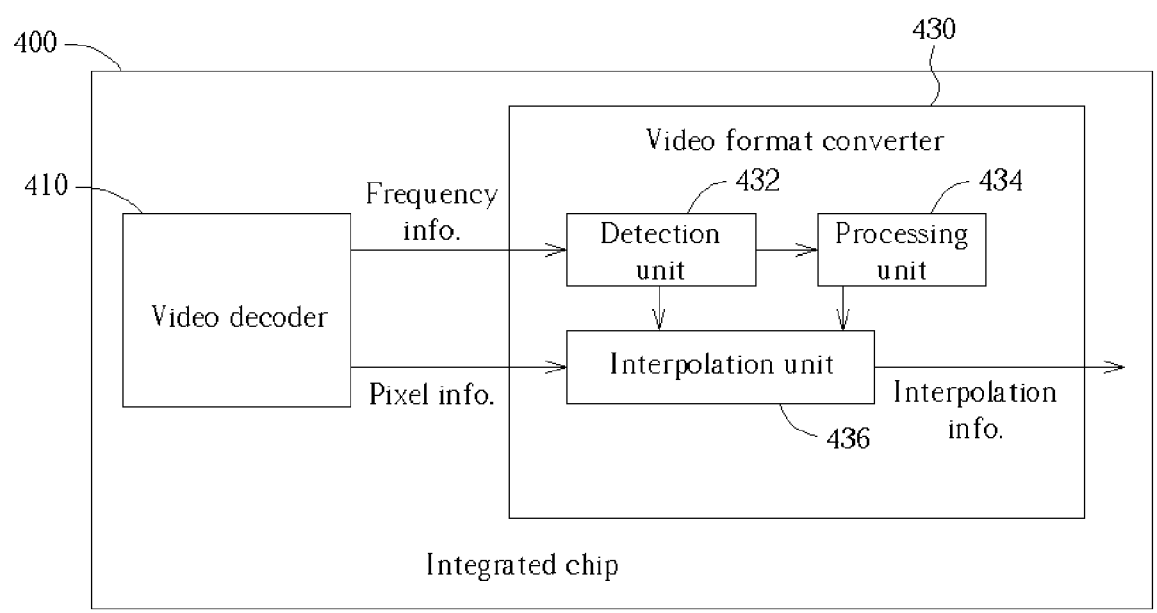
FIG. 4 is a block diagram of a video processing device according to the present invention.
Figure 5:
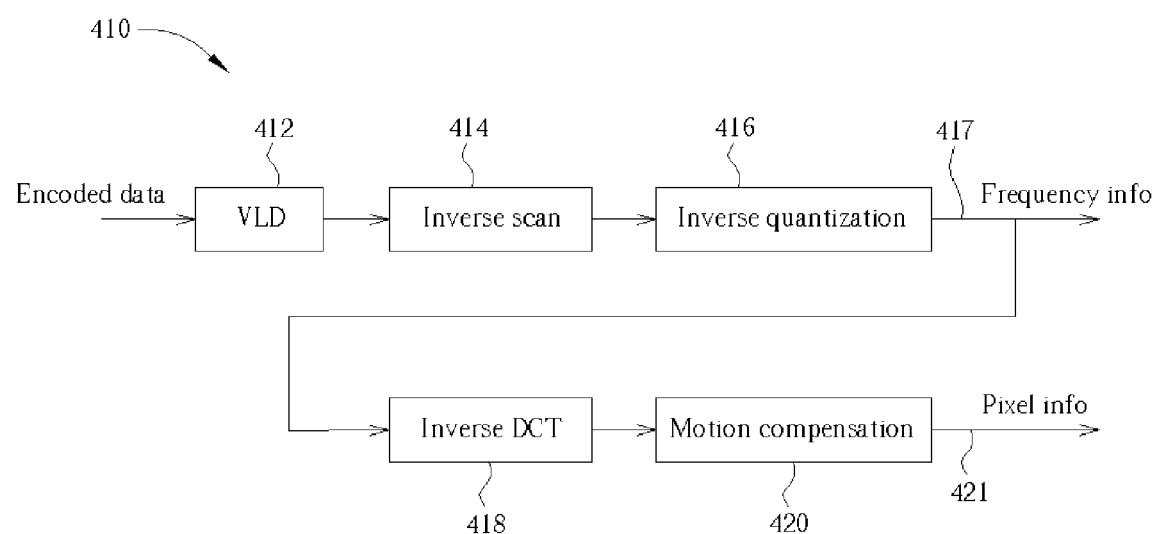
FIG. 5 is a block diagram of the video decoder shown in FIG. 4.

Please refer to FIG. 3, FIG. 4, and FIG. 5 at the same time. FIG. 3 is a flowchart illustrating steps of a method for interpolating a pixel within an image according to a first embodiment the present invention. The image has a plurality of pixels arranged in a matrix format. FIG. 4 is a block diagram of a video processing device 400 for implementing the method shown in FIG. 3. In the first embodiment, the video processing device 400 includes a video decoder 410 and a video format converter 430 including a detection unit 432, a processing unit 434, and an interpolation unit 436, all integrated into a microchip. As shown in FIG. 5, which is well known in the art, the video decoder 410 is capable of generating frequency information and pixel information of an image during a video decoding process according to encoded data of the image. The frequency information can be the Discrete Cosine Transform (DCT) data relating to the image, and more particularly, the DCT coefficients of an image block. The pixel information are pixel values of the image. Of concern, the pixel values are typically values that represent the brightness and/or color levels of each pixel. The video format converter 430 is capable of interpolating a pixel within the image according to the DCT coefficients and the pixel values. The first method of the present invention is described as follows:

Step 310: Generate the DCT coefficients of the block with the video decoder 410 according to encoded data of the image.

Step 320: Detect if there is an edge in a block of the image with the detection unit 432 according to the DCT coefficients of the block, within which the pixel is located.

Step 330: If an edge is detected, determine an interpolation direction of the pixel with the processing unit 434 according to the DCT coefficients, and interpolate the pixel with the interpolation unit 436 according to the interpolation direction.

Step 340: If no edge is detected, interpolate the pixel vertically or horizontally with the interpolation unit 436.

As shown in FIG. 6, the above-mentioned DCT coefficients include a plurality of low frequency DCT coefficients $C_{01}$ and $C_{10}$. Step 320 utilizes the low frequency DCT coefficients $C_{01}$ and $C_{10}$ to detect the edge. In step 320, the detection unit 432 compares the low frequency DCT coefficients $C_{01}$ and $C_{10}$ with a threshold TH_no_edge to detect the edge. If the low frequency DCT coefficient $C_{01}$ is smaller than the threshold TH_no_edge and the low frequency DCT coefficient $C_{10}$ is smaller than the threshold TH_no_edge, no edge is detected. Therefore, the interpolation unit 436 interpolates the pixel vertically or horizontally as described in step 340. Otherwise, an edge is detected and then, in step 330, the processing unit 434 determines the interpolation direction according to a difference ($IC_{01}I$-$IC_{10}I$) between the absolute values $IC_{01}I$, $IC_{10}I$ of the low frequency DCT coefficients $C_{01}$ and $C_{10}$ and according to the signs of the low frequency DCT coefficients $C_{01}$ and $C_{10}$. The processing unit 434 includes a lookup table corresponding to the low frequency DCT coefficients $C_{01}$ and $C_{10}$, and the processing unit 434 is capable of determining the interpolation direction according to the lookup table. Please note, the above-mentioned lookup table can be replaced by a specific arithmetic unit (not shown) for generating a calculation result according to the low frequency DCT coefficients $C_{01}$ and $C_{10}$, and the processing unit is capable of determining the interpolation direction according to the calculation result. That is, the function of the specific arithmetic unit is equivalent to the function of the lookup table and therefore, the specific arithmetic unit maps the same way as that shown in FIG. 7 illustrating the lookup table.

Figure 8:
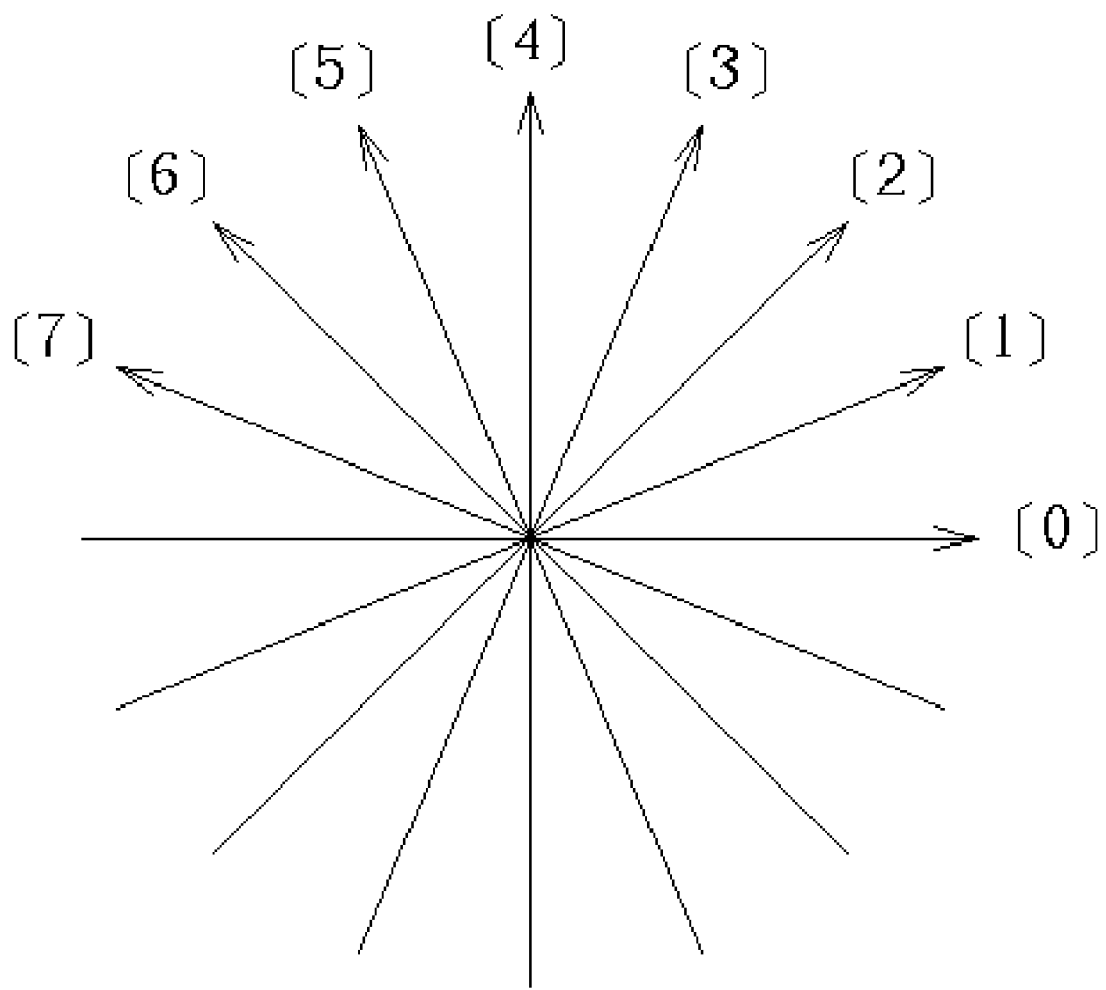
FIG. 8 is a diagram of edge directions corresponding to the edge indexes shown in FIG. 7.

Please refer to FIG. 3, FIG. 6, FIG. 7, and FIG. 8 at the same time. FIG. 7 illustrates the lookup table or the function of the specific arithmetic unit used in step 330. FIG. 8 illustrates detected edge directions corresponding to the edge indexes [0], [1], . . . [7] shown in FIG. 7. The operation results of "sign($C_{01}$)==sign($C_{10}$)" of step 330 are listed in the first row of the table shown in FIG. 7. The operation result "1" denotes that the signs of the low frequency DCT coefficients $C_{01}$ and $C_{10}$ are equivalent, and the operation result "0" denotes that the signs of the low frequency DCT coefficients $C_{01}$ and $C_{10}$ are different. The possible ranges of the operation results of "$IC_{01}I$-$IC_{10}I$" of step 330 are listed in the second row of the table. Please note, the thresholds TH1, TH2 are positive values derived from experimental results of test images or trial processes relating to the present invention method and device. The value of TH1 is greater than the value of TH2. The third row of the table contains the edge directions corresponding to the first and second rows of the table. As a result, the processing unit 434 determines the interpolation direction to be one of the edge directions shown in FIG. 8 according to the table shown in FIG. 7.

Figure 9:
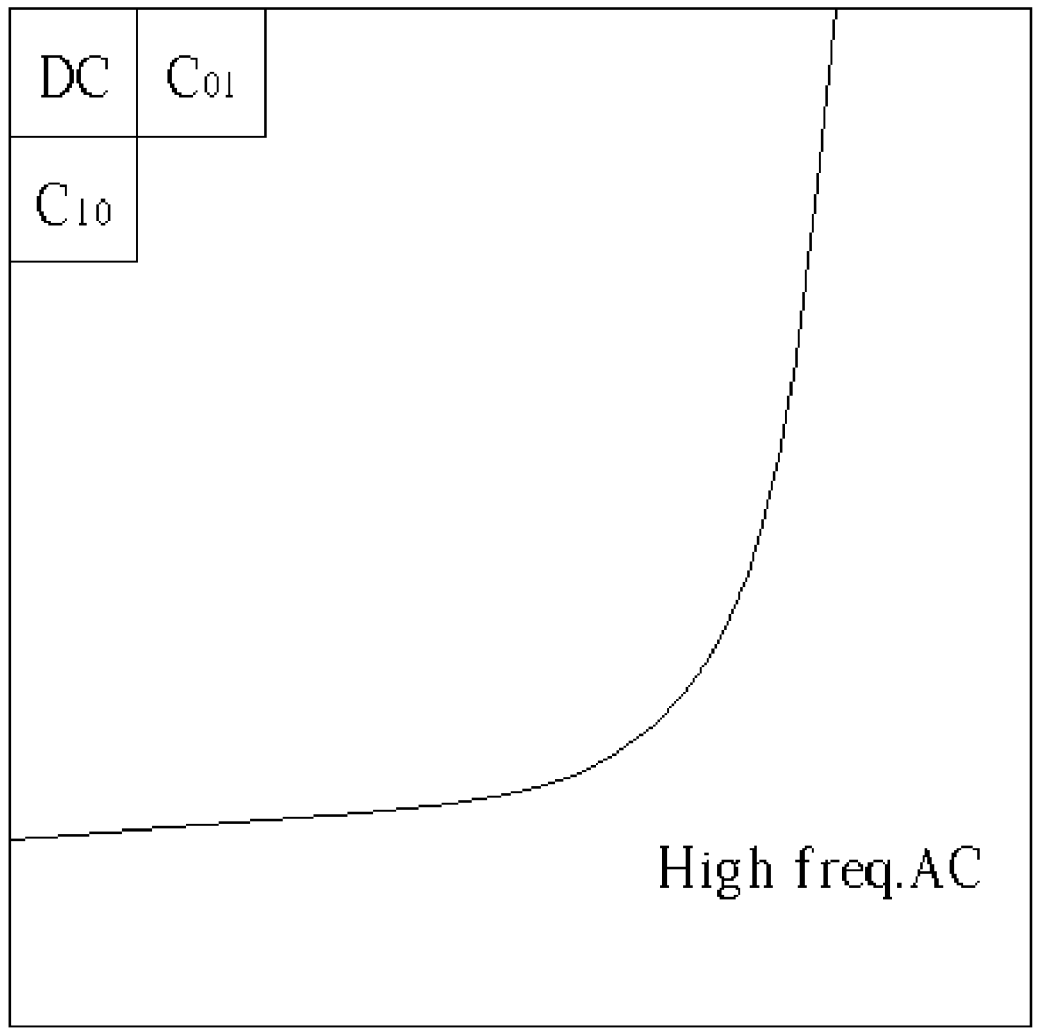
FIG. 9 is a hypothetical representation of the high frequency portion of the DCT coefficients shown in FIG. 6.
Figure 10:
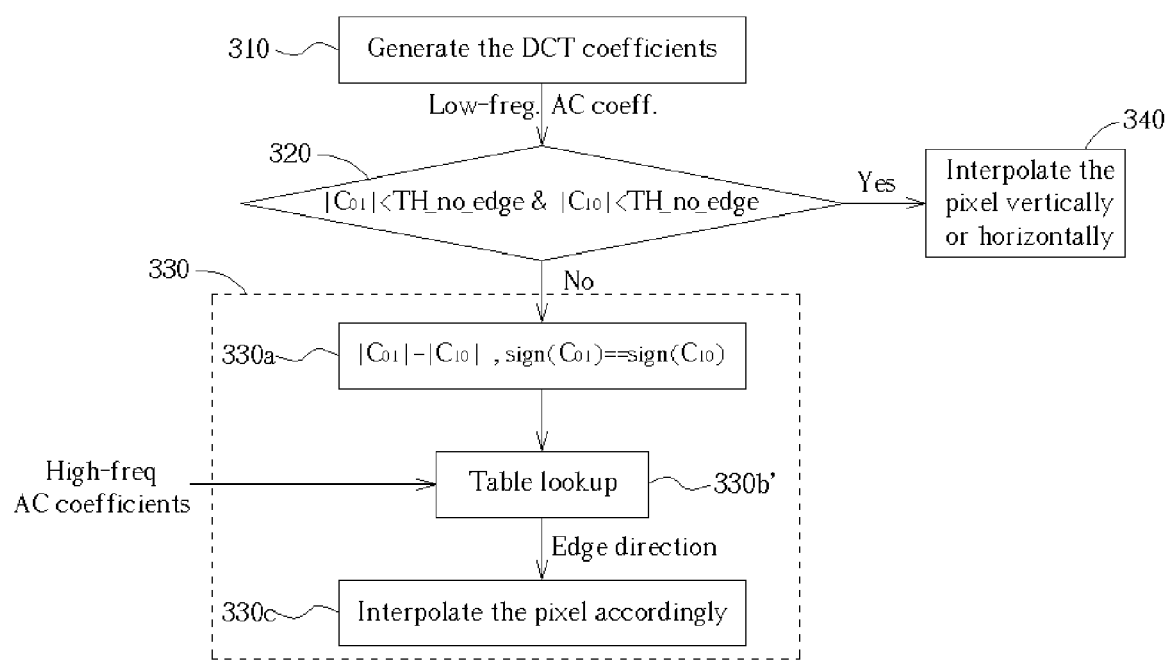
FIG. 10 is a flowchart illustrating steps of a method of pixel interpolation according to a second embodiment the present invention.

FIG. 9 is a hypothetical representation of the high frequency portion of the DCT coefficients shown in FIG. 6. The DCT coefficients include a plurality of high frequency DCT coefficients. The block "DC" denotes the Direct Current (DC) DCT coefficients $C_{00}$ and "AC" denotes the other DCT coefficients. The second embodiment of the present invention is similar to the first embodiment with an exception that the processing unit 434 further compares the high frequency DCT coefficients with a threshold TH_multi_dir to detect edges having different directions. The processing unit 434 is capable of comparing one of the high frequency DCT coefficients with the threshold TH_multi_dir to detect the edges having different directions. If one of the high frequency DCT coefficients is greater than the threshold TH_multi_dir, edges having different directions are detected, and therefore, the processing unit 434 interpolates the pixel vertically or horizontally. That is, the interpolation direction should be in either the vertical or horizontal directions. A revised flowchart is illustrated in FIG. 10. In step 330b, the processing unit 434 is capable of detecting if there are a plurality of edges having different directions in the block according to the high frequency DCT coefficients and a revised version of the table of the processing unit 434.

A third embodiment of the present invention is similar to the second embodiment with an exception that the above-mentioned comparison using the threshold TH_multi_dir is varied. According to the third embodiment, the present invention further includes comparing an average of the high frequency DCT coefficients with the threshold TH_multi_dir to detect edges having different directions.

Please note that the video processing device 400 can also be implemented by replacing the video decoder 410 with a video encoder 410 having an inversed process flow when compared with the video decoder 410 shown in FIG. 5. Therefore, in a fourth embodiment, which is similar to the first embodiment, Step 310 is revised as follows:

Step 310': Generate the DCT coefficients with the video encoder 410 according to raw data of the image.

In contrast to the prior art, the present invention method utilizes the frequency information of a block surrounding the interpolated pixel. The edge direction detected by the present invention method and the present invention device is more accurate and less sensitive to noise than that in the prior art, and therefore, the performance of the directional interpolation of the interpolated image is improved.

It is another alteration that the present invention method and device can couple to other directional interpolation algorithm to verify the edge direction further, and therefore, the accuracy of the directional interpolation is improved.

It is another advantage of the present invention method and device that the DCT data is readily available in a video encoder or a video decoder, and therefore, the implementation of the present invention is easy to achieve.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for interpolating a pixel within an image, the image having a plurality of pixels arranged in a matrix format, the method comprising:
   (a) detecting if there is an edge in a block of the image according to Discrete Cosine Transform (DCT) data of the block, within which the pixel is located;
   (b) if an edge is detected, determining an interpolation direction for the pixel according to the DCT data, and interpolating the pixel according to the interpolation direction; and
   (c) if no edge is detected, interpolating the pixel vertically or horizontally.

2. The method of claim 1, wherein the DCT data comprises DCT coefficients, step (a) utilizes the DCT coefficients to detect the edge, and step (b) utilizes the DCT coefficients to determine the interpolation direction.

3. The method of claim 2, wherein the DCT coefficients include a plurality of low frequency DCT coefficients, step (a) utilizes the low frequency DCT coefficients to detect the edge, and step (b) utilizes the low frequency DCT coefficients to determine the interpolation direction.

4. The method of claim 3, wherein step (b) further comprises:
   determining the interpolation direction according to a lookup table corresponding to the low frequency DCT coefficients.

5. The method of claim 3, wherein step (a) further comprises:
   comparing the low frequency DCT coefficients with a threshold to detect the edge.

6. The method of claim 3, wherein step (b) further comprises:
   determining the interpolation direction according to a difference between absolute values of the low frequency DCT coefficients and according to signs of the low frequency DCT coefficients.

7. The method of claim 2, wherein the DCT coefficients include a plurality of high frequency DCT coefficients, and the method further comprises:
   (d) detecting if there are a plurality of edges having different directions in the block according to the high frequency DCT coefficients.

8. The method of claim 7, wherein step (d) further comprises:
   comparing the high frequency DCT coefficients with a threshold to detect the edges having different directions.

9. The method of claim 7, wherein step (d) further comprises:
   comparing an average of the high frequency DCT coefficients with a threshold to detect the edges having different directions.

10. The method of claim 7, wherein step (d) detects the edges having different directions according to a lookup table corresponding to the DCT coefficients.

11. The method of claim 10, wherein step (b) further comprises:
    determining the interpolation direction according to the lookup table.

12. The method of claim 7, wherein step (c) further comprises:
    if no edge is detected or edges having different directions are detected, interpolating the pixel vertically or horizontally.

13. The method of claim 1, further comprising:
    (d) generating the DCT data according to raw data of the image or encoded data of the image.

14. A device for interpolating a pixel within an image, the image having a plurality of pixels arranged in a matrix format, the device comprising:
    a detection unit for detecting an edge in a block of the image according to Discrete Cosine Transform (DCT) data of the block, within which the pixel is located;
    a processing unit electrically coupled to the detection unit for determining an interpolation direction of the pixel according to the DCT data and a detection result generated by the detection unit; and
    an interpolation unit electrically coupled to the detection unit and the processing unit for interpolating the pixel;
    wherein if an edge is detected, the interpolation unit interpolates the pixel according to the interpolation direction, and if no edge is detected, the interpolation unit interpolates the pixel vertically or horizontally.

15. The device of claim 14, wherein the processing unit is capable of detecting edges having different directions in the block according to the DCT data.

16. The device of claim 15, wherein if no edge is detected or edges having different directions are detected, the interpolation unit interpolates the pixel vertically or horizontally.

17. The device of claim 14, wherein the processing unit includes a lookup table corresponding to the DCT data, and the processing unit is capable of determining the interpolation direction according to the lookup table.

18. The device of claim 14, wherein the processing unit includes a lookup table corresponding to the DCT data, and the processing unit is capable of detecting edges having different directions in the block according to the lookup table.

19. The device of claim 14, wherein the processing unit includes a specific arithmetic unit for generating a calculation result according to the DCT data, and the processing unit is capable of determining the interpolation direction according to the calculation result.

20. The device of claim 14, further comprising a video decoder or a video encoder electrically coupled to the detection unit for generating the DCT data.

* * * * *